Figure 5:
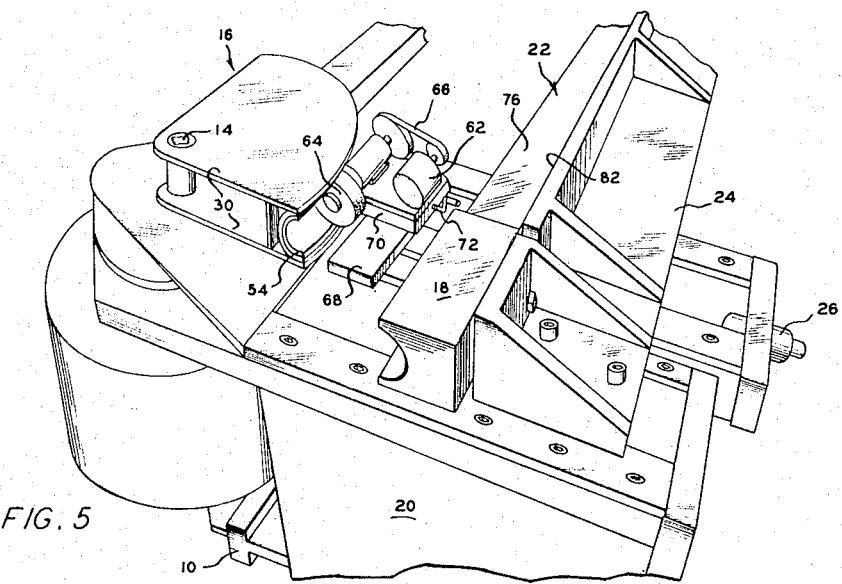

Dec. 26, 1967  G. E. McDOWELL  3,359,835
METHOD OF MAKING A TUBE-BENDING DIE
Original Filed March 13, 1963  2 Sheets-Sheet 1
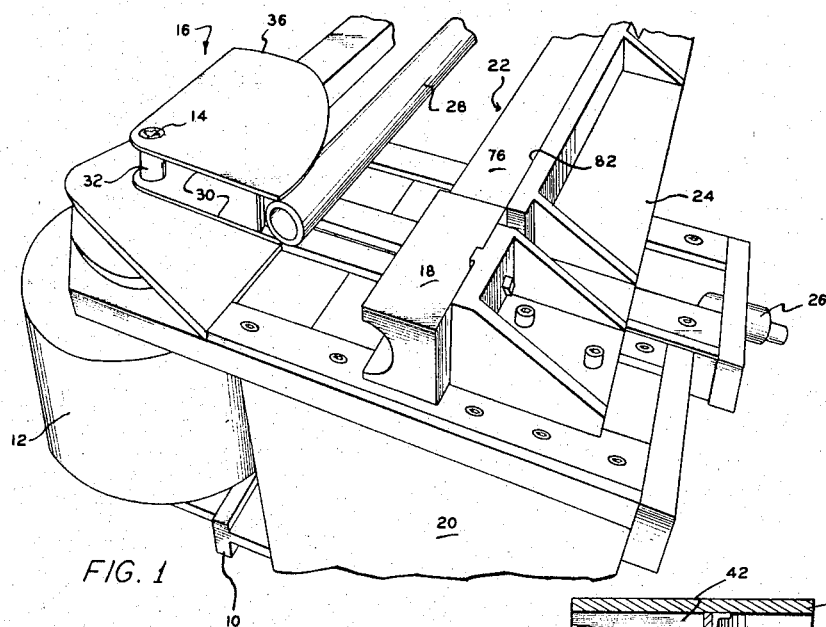
FIG. 1
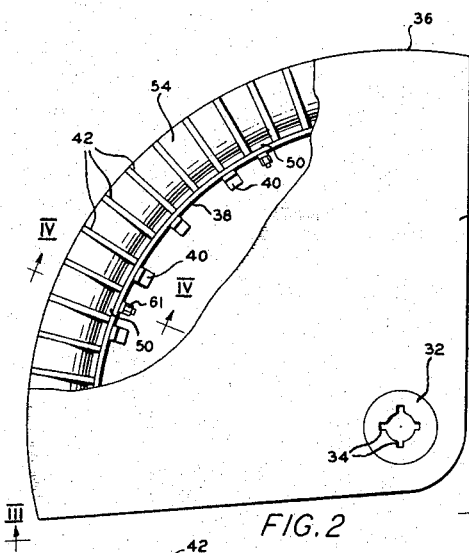
FIG. 2
FIG. 3
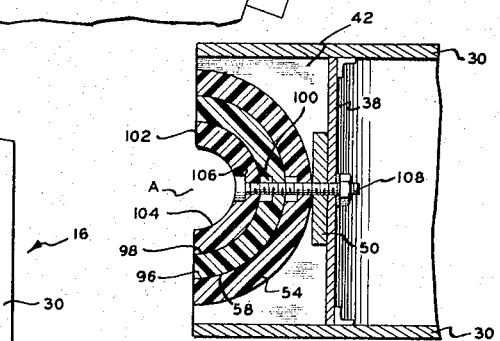
FIG. 6
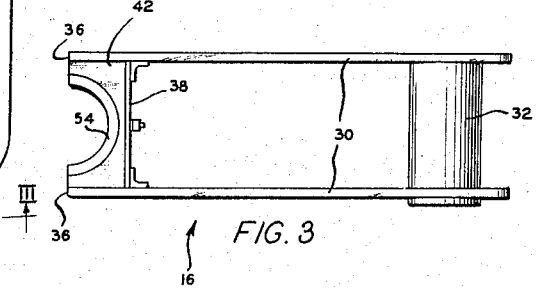
FIG. 4
INVENTOR
GEORGE E. McDOWELL
ATTORNEYS Dec. 26, 1967  G. E. McDOWELL  3,359,835
METHOD OF MAKING A TUBE-BENDING DIE
Original Filed March 13, 1963  2 Sheets-Sheet 2

INVENTOR
GEORGE E. McDOWELL
BY Beaman & Beaman
ATTORNEYS 3,359,835
METHOD OF MAKING A TUBE-BENDING DIE
George E. McDowell, Ypsilanti, Mich., assignor to Michigan Tube Benders, Inc., Ypsilanti, Mich.
Original application Mar. 13, 1963, Ser. No. 264,977, now Patent No. 3,276,236, dated Oct. 4, 1966. Divided and this application June 16, 1966, Ser. No. 558,105
4 Claims. (Cl. 76—107)

This application is a division of my copending application Ser. No. 264,977, filed Mar. 13, 1963, now Patent No. 3,276,236.

The invention pertains to bending dies and is particularly concerned with a method of making bending dies of the type employed with tube- or conduit-bending machines.

In the shaping of tubes and conduits, bending machines are usually employed to form curves, radii, and angular bends in the relatively large tube sizes, such as those tubes over two inches in diameter. Machine bending may also be employed, of course, with smaller sizes of tubes, if desired. The advantages of employing bending machines result from the need of the necessary power to form the bend and also permit die and mandrel structure to be used for supporting the tube walls to control any tendency for the wall to wrinkle, collapse, or deform during bending. Common bending machine arrangements include a rotating die employed in conjunction with a stationary die whereby the tube is clamped to the rotating die and, as the rotating die pivots about its axis, the stationary or wiping die maintains the conduit in engagement with the arcuate surface of the rotatng die. Other tube-bending apparatus commonly in use employ an arcuate die having a recess defined therein corresponding to the configuration of the conduit to be bent and the desired radius to be formed, and means are provided for gripping the conduit on either side of the die and wrapping the conduit about the die to provide the desired bend. The die structure of the invention may be employed with either of these types of tube-bending devices.

In conventional practice, dies for tube- and conduit-bending machines are formed of solid, or substantially solid, blocks of metal wherein the configuration of the die and the groove defined therein are directly machined into the metallic body forming the die. As it is not uncommon to require bends having a six foot radius with a twelve inch diameter tube, for instance, it will be appreciated that such a bend requires a massive die which will be six feet in radius and greater than twelve inches in thickness. A die of this size is very heavy and expensive, and it is, therefore, not practical or economically possible to maintain a large inventory of bending dies to accommodate a wide variety of tube diameters and bend radii. Consequently, a designer employing conduit or tubes larger than six inches in diameter will usually design his tube configurations within the capabilities of standard bends and dies, if possible, even if the result compromises the optimum construction. Tubes and conduits of odd sizes, or requiring unusual radius bends, necessitate the construction of special dies and, thus, the forming of a bend in such tubes can be very expensive.

It is an object of the invention to provide a method of making a bending die for tubes, conduits, and the like, wherein the die may be readily fabricated of inexpensive materials, and wherein the die weight is substantially reduced over the weight of similar size dies of conventional construction.

Another object of the invention is to provide a method of making a tube-bending die of economical and light-weight construction which may be assembled from easily manufacturable components, and is capable of withstanding the high compressive forces imposed thereon without adverse effect.

Another object of the invention is to provide a method of making bending die strutcure for tube-bending machines, and the like, wherein the method of forming such dies may be accomplished upon the bending machine itself, and commercially available materials are employed in the fabrication thereof.

A further object of the invention is to provide a method of making a tube-bending die liner having an arcuate recess for receiving the tube wherein the liner is of a noncompressible, synthetic material. In accord with the practice of the method of the invention, the liner may be finally shaped upon the machine and requires little, if any, attention from the operator during usage.

Yet another object of the invention is to provide a method of forming a tube-bending die employing a moldable, hardenable material, wherein the moldable material may be readily shaped to provide a recess for receiving the conduit to be bent, or for receiving a liner which directly engages the conduit.

Figure 7:
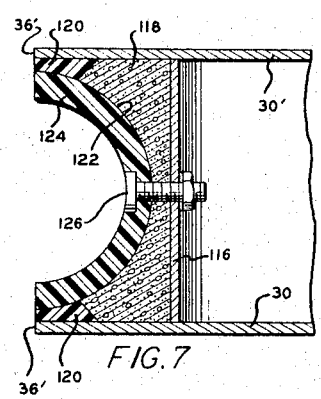
Figure 8:
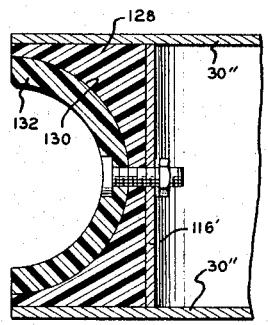
Figure 9:
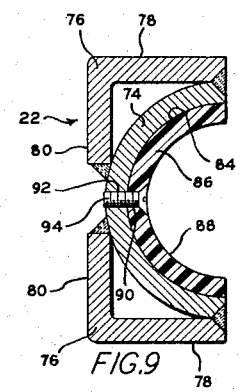
Figure 10:
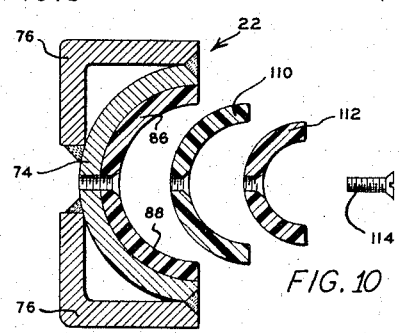
Figure 11:
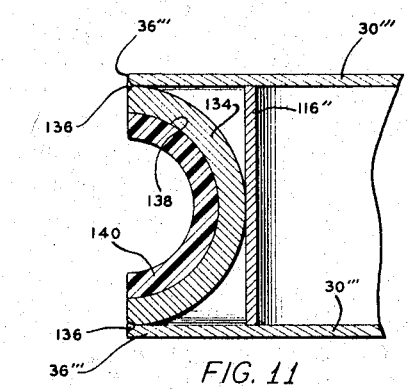

These and other objects of the invention arising from the details and relationships of the components of die embodiments practicing the method of the invention will be apparent from the following description and accompanying drawings wherein:

FIG. 1 is a perspective view of a tube-bending machine employing a rotary die, in accord with the invention, illustrating the clamp and wiping die out of engagement with the tube to be bent, FIG. 2 is a plan view of a bending die, in accord with the invention, wherein a section of the supporting member plate has been removed to illustrate the relationship of the backup and forming plates, FIG. 3 is an elevational view of the die structure of FIG. 2, as taken along section III—III thereof, FIG. 4 is an enlarged detail, sectional, elevational view of the liner, forming plate, backup plate, and supporting members employed in a die, in accord with the invention, as taken along section IV—IV of FIG. 2, FIG. 5 is a perspective view of a rotating die tube-bending machine having a die mounted thereon, in accord with the invention, wherein grinding apparatus has been mounted upon the machine for forming the arcuate die cavity, FIG. 6 is an enlarged detail, sectional view similar to that of FIG. 4, illustrating the use of a pair of additional liners to accommodate smaller diameter conduit than that employed in the arrangement of FIG. 4, FIG. 7 is an elevational, detail, sectional view of an embodiment of the inventive concept illustrating the use of a moldable backing for the synthetic die liner, FIG. 8 is an elevational, detail, sectional view of another embodiment of the invention employing a plastic moldable material as a backing for the liner, FIG. 9 is an elevational, sectional view of a wiping die construction employing the principles and concepts of the invention, FIG. 10 is an elevational, sectional view of a wiping die construction in accord with FIG. 9, illustrating, in exploded relationship, the use of additional liners to reduce the diameter of the die cavity, and FIG. 11 is an elevational, sectional, detail view of another embodiment of the invention wherein a rigid, semi-cylindrical, forming member is directly attached to the backup plate and supporting members of a rotating die structure.

The method of making tube-bending dies in accord with the invention can best be appreciated from the following description of the apparatus:

A typical tube-bending machine of the rotary die type is shown in FIGS. 1 and 5. This type of machine includes a base 10 upon which is mounted die rotating means located within a housing 12. The die rotating means may include an electric motor and worm gear drive, or may be of the hydraulic type. In either case, the die rotating means rotates a shaft 14 supporting the rotating die structure 16. A clamping die 18 is mounted upon a swingable base 20 mounted for rotation about the axis of the shaft 14, and a wiping die 22 is mounted upon the base 10 by means of a carriage 24 whereby rotation of a feed screw 26 by a handle, not shown, translates the wiping die toward and away from the rotating die 16. During operation, the clamping and wiping dies will engage the conduit or tube 28 which is illustrated as being in the operative-engaging relationship with the rotating die at the beginning of a bend. Further description of the bending machine structure is not considered necessary, as the structure is of a conventional nature such as that shown in United States Patent No. 2,357,873.

In conventional practice, the rotating die 16 is formed of a solid machined or cast construction and, while the illustrated die is only of the type employed in producing a 90° bend, it will be appreciated that a massive die structure is required for bends having a radius of over two feet, and the mass of the die becomes very large when the die is of the type for performing 180° bends, or greater. The conventional die construction of this type of apparatus will be appreciated from the above-mentioned patent.

In accordance with the invention, it is proposed to form the tube-bending die structure upon a pair of parallel, supporting member plates 30. The supporting member plates 30 are attached to the shaft 14 by a hub 32 which may be of cylindrical configuration, and will be welded or otherwise affixed and interposed between the plates 30. The hub 32 is provided with a central bore for receiving the shaft 14, and splines or keyways 34 will be defined in the hub bore for locking the hub to the shaft for rotation therewith. The outer periphery of the die is defined by the supporting member plate edges 36, and this periphery will normally be of a partial circular configuration. The lightweight construction of the invention is largely due to the face that the tube-receiving die cavity structure is all located adjacent the periphery 36 of the plates 30 and that a void exists between the die cavity structure and the hub 32 defined by the supporting member plates.

The die cavity structure includes an arcuate backup plate 38, interposed between the supporting member plates 30, which may be directly welded to the plates or, as in the illustrated construction, the backup plate is provided with spaced angle members 40 welded thereto which are, in turn, welded to the supporting member plates 30. The angle members 40 aid in locating the backup plate upon the supporting member plates and, if desired, the backup plate may also be welded, wherever desired, to the supporting plates to form a rigid construction. As will be noted from FIG. 2, the backup plate 38 is disposed radially inwardly of the supporting member plates periphery 36 in an arcuate configuration concentric to the axis of the hub 32 and the supporting member plate edges.

A plurality of radially disposed forming plates 42 also are interposed between the supporting member plates 30. Forming plates 42 are provided with a linear rear edge 44 which abuts against the backup plate 38, and the forming plates are of such radial depth that upon engagement with the plate 30, the outer edges 46 thereof will substantially coincide with the support member plate peripheral edges 36. The forming plates 42 are provided with a semicircular recess 48 and are welded to the supporting member plates 30 and may also be welded to backup plate 38.

A number of anchor plates 50, four in the embodiment of FIG. 2, are interposed between adjacent forming plates 42, and are contiguous with the backup plate 38. Holes 52 are defined in the anchor plates wherein a bolt for maintaining the liner in a recess may be inserted therethrough, as will be described later. The anchor plates 50 are of a thickness substantially equal to the distance from the outer surface of the backup plate to the innermost portion of the recess 48, as will be apparent from FIG. 4. In this construction the primary forces imposed upon the die will be borne by the forming plates 42 and, thus, the backup plate 38 functions mainly as a positioning member when locating the forming plates relative to the supporting plates 30.

An arcuate liner 54 is located within the recesses 48 of the forming plates 42. The inner surface 56 of the liner 54 is received within the recess of the forming plates, and the outer concave surface 58 of the liner forms the die cavity for receiving the tube to be bent. The liner 54 is preferably formed of a synthetic, plastic material such as that commonly known as fiberglass which includes a plurality of layers of fiberglass cloth impregnated with a hardenable resin. The laminating resin is of a type having a very high compression strength whereby the liner 54 will be substantially rigid and capable of withstanding high compressive forces.

Fasteners, such as screws 60, are embedded within the liner 54 and extend through the holes 52 in the anchor plates 50. A corresponding hole is also located within the backup plate whereby the screws 60 may extend through the anchor and positioning plates, and nuts 61 threaded upon the screws insure that the liner 54 will be firmly maintained within the recess of the forming plates.

In the construction of the embodiment of FIGS. 1 through 4, the liner 54 may be formed by impregnating fiberglass cloth of about .020″ thickness with a resin and hardener mixture highly resistant to compressive forces. The impregnated fiberglass fabric strips are laid in the recesses 48 of the forming plates and are preferably of such length as to extend the circumference of the die. Succesive layers of the impregnated fiberglass are laid upon each other whereby a liner thickness of the desired dimension is produced. The thickness of the liner required will vary according to the wall thickness and type of tube to be bent. However, the liner will be built up wherein the unfinished outer surface thereof will be of a lesser sectional radius than that of the tube to be bent. While the liner is in the process of hardening, the screws 60 may be embedded therein, or the liner may be completely hardened before the holes for receiving the screw are bored and countersunk.

A variety of synthetic, plastic materials are suitable for forming the liner. However, by way of example, the laminating resin and hardened manufactured by Ren Plastics, Inc., Lansing Mich., identified as RP–1710 is suitable. Prior to placing the first layer of resin-impregnated fiberglass cloth in the recesses 48, the edges of the recesses will usually be coated with a grease or other substance which prevents the fiberglass cloth from bonding to the forming plates.

After the liner has hardened, the die structure 16 is placed upon the bending machine shaft 14, if it was not already located thereon, and grinding apparatus is mounted upon the machine structure adjacent the periphery of the die. Such grinding apparatus may be of any conventional nature and may consist of a portable grinder located upon suitable base means. In the illustrated embodiment, the grinding apparatus includes a motor 62 which drives grinding wheel 64 by a belt 66. The grinding apparatus is mounted upon the bending die apparatus by means of a base 68, and the motor and grinding wheel are located upon a slide 70 supported upon the base 68 whereby the grinding wheel 64 and motor may be moved in a radial direction with respect to the die 16 by means of a feed screw 72. In locating the grinding apparatus upon the bending machine, the grinding wheel 64 will normally be located in a plane which is radial with respect to the shaft 14, and the grinding wheel will be of a diameter equal to that of the tube to be bent. It will be noted that the grinding wheel is located upon the binding machine apparatus at substantially the same location that the unformed tube initially engages the die, see FIG. 1.

Upon starting the grinding wheel motor 62, the grinding wheel is radially translated by means of the feed screw 72 toward the died until the wheel engages the liner 54. As soon as the grinding wheel has been located at the desired depth of cut, the die structure 16 is rotated by the shaft 14 and the conventional shaft rotating means of the machine wherein the die will be swung in an arc past the grinding wheel, and the grinding wheel will form the outer surface of the liner 54. Successive cuttings will be taken wherein the grinding wheel may be moved further toward the shaft 14 after each full cycle of the shaft rotation to increase the depth of cut, and the die will be swung past the grinding wheel during each cutting operation. Such shaping of the outer concave surface of the liner continues until the desired thickness of the liner is produced. This thickness will be that achieved when the axis of the grinding wheel becomes tangent to the plan projection of plate peripheral edges 36. At this time the liner will usually be of uniform wall thickness. Therefore, it will be appreciated that a very accurate die cavity on the rotating die may be machined by employing conventional and readily available apparatus, and the fact that the died cavity is formed on the apparatus on which bending takes place insures that the cavity will be concentrically related to the axis of die rotation during bending.

The wiper die 22 employed with rotating die tube-bending apparatus may be either of the stationary type wherein the tube is "wiped" or moved relative to the wiping die. In such instances the wiping die cavity is usually lubricated to prevent scoring of the tube. In other rotating die tube-bending machines the wiper die is mounted for axial movement upon the apparatus. In this case, as the tube is bent around the rotating die, the wiper die axially moves with the tube wherein no relative movement between the tube and wiper die takes place. It is this latter type of apparatus which is illustrated in FIGS. 1 and 5. However, it will be appreciated that the inventive concepts described below with relation to wiper dies may be employed with either type of wiper die.

A simplified construction of wiper die may be formed in accord with the invention as illustrated in FIG. 9. The wiper die of FIG. 9 includes a linear, semicyclindrical form member 74 to which rectangular angle elements 76 are attached by weld fillets. The form member 74 is of a longitudinal, linear configuration and may merely consist of a cylindrical conduit or tube which has been longitudinally slit, or cut, in a diametrical manner. The form member 74 will normally be constructed of steel, and the angle elements 76, which may be of conventional angle iron stock, include horizontal, exterior surfaces 78 and vertical outer surfaces 80. The angle members are welded to the form member 74 so that the surfaces 80 are coplanar wherein the exterior surfaces of the angle members together define three sides of a rectangular configuration. This relationship of the angle members permits the lower surface 78 to rest upon the tube-bending machine apparatus so that the surfaces 80 will engage the bearing surface 82, FIG. 1, defined upon the bending machine apparatus. Thus, the surfaces 80 constitute bearing surfaces resisting the compression forces imposed upon the wiper die during the bending operation.

Normally, the recess 84, defined by the semicylindrical form member 74, will be lined with a synthetic, plastic material liner 86 which may be formed of fiberglass in the manner disclosed above. Strips of fiberglass cloth are impregnated with resin and hardener mixtures and laid into the recess 84 after the recess has first been coated with coating to prevent bonding of the liner material to the form member. The layers of fiberglass cloth are built upon each other until the liner 86 achieves a thickness which will produce a concave semicylindrical recess of a diameter slightly less than that of the tube to be bent.

Accurate sizing of the die cavity surface 88 of the liner 86 may be produced by means of a machine-mounted grinding wheel wherein the wiping die is moved past the grinding wheel in a linear direction. However, due to the linear construction of the wiping die, it is possible to build up the liner thickness to the thickness wherein the surface 88 will have a diameter substantially equal to that of the tube to be bent, and a length of the tube to be bent may be coated with a covering, to prevent bonding of the fiberglass thereto, and then laid into the cavity of the liner 86 to accurately size the cavity. As the tubes to be bent will initially be in a linear form, it is possible to use the tube itself as a mold for shaping the cavity.

After the liner 86 has hardened, or during hardening, countersunk holes 90 are formed in the linear and aligned threaded holes 92 are defined in the form member 74 whereby screws 94 removably affix the liner within the form member 74.

To permit the use of a single die for bending several diameters of tubes, it is possible to employ a plurality of nested liners to decrease the diameter of the die cavity.

Thus, with reference to FIG. 6, after the liner 54 has been formed and sized for receiving the maximum diameter of tube which may be bent with a given die structure, the outer surface 58 may be coated with a nonbonding lubricant or covering and a second liner 96 of resin-impregnated fiberglass may be formed within the liner 54 using the liner 54 as the mold. Such a liner 96 would be built up until the concave surface thereof was of a diameter slightly less than the diameter of a conventional tube O.D. Countersunk screw and screwhead-receiving recesses 100 are defined in the liner 96, whereby fastening means similar to that of FIG. 4 may be employed to maintain the liner 96 within the liner 54. The outer surface 98 of the liner 96 is then formed by grinding to the desired diameter by means of the grinding wheel operation illustrated in FIG. 5.

In like manner, a third liner 102 may be built up within the liner 96 to produce an even smaller diameter die cavity. The liner 102 will also be formed of fiberglass fabric impregnated with resin, and the surface 98 is coated to prevent bonding of the liner 102 to the liner 96. The concave surface 104 will also be ground to the desired diameter, and is provided with countersunk screws and screwhead-receiving recesses 106. The three liners may be maintained in relative relationship and affixed to the forming plates 42 by the screw 108, as illustrated in FIG. 6.

It will be appreciated that as the liners 54, 96, and 102 may be assembled in a nested relation to permit a plurality of diameters of tubes to be bent on a given die structure that by merely inventorying various liner sizes, the operator of tube-bending apparatus need not maintain separate dies for each diameter of tube for a given diameter of bend or die radius. It will be noted that the axes A of the liners coincide and, thus, the center of the tube to be bent will always coincide with the axes A, which are in alignment with the edges 36 of the die structure 16.

In a like manner the wiping die 22 may support a plurality of liners 110 and 112 which are maintained within the liner 86 by screw 114 whereby a smaller size tube than that which would be accommodated by the liner 86 may be supported in the wiping die. As the wiping die need only vary with respect to the cavity diameter due to its linear form, the use of the liners 110 and 112 permits the wiping die to be very quickly adapted to the tube to be bent, and only a relatively few wiping die liners need be kept on hand to accommodate the standard sizes of tubes.

The concepts of the invention may also be practiced in a die structure which eliminates the use of the metal forming plates 42. Embodiments of die structure not employing the forming plates are shown in FIGS. 7 and 8. In these embodiments the die-supporting plate members 30′ are provided with a hub, not shown, similar to that of 32, FIG. 2. Near the outer edge 36' of the supporting members 30' a backup plate 116 is welded between the supporting plates 30' in a manner similar to that of the backup plate 38 of FIGS. 2 through 4. However, in these embodiments the backup plate 116 will normally be of a greater strength than the backup plate 38, as forces will be directly imposed upon the plate 116 during tube bending. Upon interposing the backup plate 116 between the support members 30', an open-sided chamber is defined by the plates 30' and 116 of a radial depth equal to the radial distance separating the backup plate from the ends 36' of the supporting members. In the embodiments of FIG. 7, this chamber is substantially filled with a cement mixture 118 of a high compressive resistance. The cement mixture does not extend to the edges of the plates 30', but rather a synthetic, plastic material 120 is filled therein to provide reinforcing wherein the cement would be very thin if continued to the edge of the support plates. The cement mixture 118 is permitted to harden within the chamber. After the cement mixture has hardened, a scraper having a diametrical surface defined thereon, corresponding to the diameter of the concave surface 122 to be formed in the cement, is affixed upon the bending machine apparatus and the entire die structure is swung past the scraper whereby the scraper removes the undesired cement mixture in a manner similar to that described above as achieved by the grinding wheel 64. The scraper will be slowly fed into the cement mixture on successive movements of the die until the desired diameter of surface 122 is achieved. The plastic may also be formed during this scraping operation or may be formed by a grinding operation similar to that employed in forming the liner 54, FIG. 4. After the surface 122 is properly sized, a synthetic, plastic liner 124 is built-up from the surface 122 in the before-described manner, and is provided with fastening screws 126 extending through plate 116. The outer cavity surface of the liner 124 will then be machined to the proper size by the use of the grinding wheel arrangement described in conjunction with FIG. 5.

In the embodiment of FIG. 8, the chamber defined by plates 30'' and the backup plate 116' will be substantially filled with a plastic backing material 128 of a synthetic nature of high compressive strength which is capable of being molded to the form of the chamber, and will then harden. The plastic backing 128 is then provided with a concave surface 130 by means of the grinding operation of FIG. 5. After the surface 130 has been formed, a synthetic, fiberglass liner 132, or the like, may be built-up and sized within the surface 130 in the manner described above.

The embodiments of FIGS. 7 and 8 thus employ a hardenable cement or plastic which molds itself to the configuration of the die chamber, and eliminates the use of metallic forming plates 42.

Another variation of construction of the rotating die is shown in FIG. 11 wherein a backup plate 116'' is interposed between the supporting members 30''' at a distance set back from the outer peripheral edges 36''' of the supporting members. A semicircular form member 134 is welded at 136 to the supporting plates and is in engagement with the backup plate 116''. Thus, the arcuate form member 134 defines the concave surface 138 in which the synthetic, plastic liner 140 may be built up. The liner 140 may be releasably fastened to the form member 134 by a screw, not shown, similar to that of the embodiment of FIG. 9. In this embodiment the use of the backup plate 116'' is optional.

The form member 134 may be constructed of a tube which has been bent on a radius equal to that of the edges 36''', and then slit or cut on the vertical diameter to form the desired semicircular configuration. The similarity between the fabrication of the die members of the embodiment of FIGS. 9 and 11 will be appreciated, and the advantage of these embodiments arises from the fact that the machining or forming of the liner-engaging surface is eliminated, due to the existence of an accurate concave surface in the tube which forms the form member.

It will be appreciated that the invention produces an inexpensive and lightweight die which is capable of performing all the functions required in bending die apparatus. Dies may be fabricated in accordance with the invention for use with tube-bending machines other than of the rotating die type which employ a cavity receiving the tube, and it is not intended to limit the die construction to that for use with rotating die machines. The fact that the liners may be removed from the forming members permits a versatility of die structure use unkonwn in the art, and as the manufacture of the liners is relatively simple and may be accomplished with a minimum of equipment, die liners to accommodate odd sizes of tubes may be readily manufactured at economical cost. Thus, the method of the invention substantially reduces the cost of bending tubes, particularly of large sizes, and significantly reduces the die investment of tube-bending machine owners.

It is understood that various modifications of the invention may be apparent to those skilled in the art without departing from the spirit and scope thereof, and it is intended that the invention be defined only by the scope of the following claims.

I claim:

1. The method of forming a lightweight, inexpensive tube-bending die adapted to be rotated about an axis comprising the steps of interconnecting a pair of plate members in spaced relationship, forming a hub member upon said plates defining the axis of rotation of the die, interposing a backup member between said plates and connected thereto, said backup member being radially spaced from said hub and of a circular segment configuration concentric to said hub and including an outwardly facing concave recess, placing a nonmetallic, moldable, hardenable material within said recess, permitting said material to set and harden, and shaping said material to produce an elongated tube-receiving die cavity of arcuate longitudinal configuration concentric to said hub and concave cross-sectional configuration.

2. The method of forming a lightweight, inexpensive tube-bending die adapted to be rotated about an axis comprising the steps of interconnecting a pair of plate members in spaced relationship, forming a hub member upon said plates defining the axis of rotation of the die, interposing a backup member between said plates and connected thereto, said backup member being radially spaced from said hub and of a circular segment configuration concentric to said hub and including an outwardly facing concave recess, placing a nonmetallic, moldable, hardenable material within said recess, permitting said material to set and harden, placing said plates and assembled components upon a tube-bending machine in normal operative position wherein said hub is concentric with the operative axis of rotation of the die, mounting a shaping tool upon the tube-bending machine, rotating said plates and assembled components about the axis of rotation of the tube-bending machine, and engaging said shaping tool against said hardenable material while said plates and assembled components are rotating to define an elongated tube-receiving die cavity of arcuate longitudinal configuration concentric to the axis of rotation of the tube-bending machine and concave cross-sectional configuration.

3. The method of forming a tube-bending die as in claim 2 wherein the tube-bending machine includes a wiping die, said shaping tool being mounted upon said tube-bending machine to engage said tube-bending die at the approximate radial location the wiping die engages a tube located within the die cavity thereby insuring a uniform relationship between said tube-bending die cavity and the wiping die during rotation of the tube-bending die.

4. The method of forming a tube-bending die as in claim 3 wherein said moldable, hardenable material defines a liner and said shaping tool consists of a rotatable grinding wheel wherein said grinding wheel machines a die cavity in said liner of a cross-sectional configuration corresponding to the configuration of said grinding wheel.

References Cited

UNITED STATES PATENTS

| | | | |
|---|---|---|---|
| 1,914,879 | 6/1933 | Bennett | 51—106 X |
| 2,272,031 | 2/1942 | Berry et al. | |
| 2,888,965 | 6/1959 | Phillips | 51—241 X |
| 3,030,259 | 4/1962 | Long | 264—219 X |
| 3,072,971 | 1/1963 | Kish. | |
| 3,108,853 | 10/1963 | Short et al. | |

JOHN F. CAMPBELL, *Primary Examiner.*

ROBERT F. WHITE, *Examiner.*

S. I. LANDSMAN, J. L. CLINE, *Assistant Examiners.*